(12) United States Patent
Stewart

(10) Patent No.: US 8,376,278 B2
(45) Date of Patent: Feb. 19, 2013

(54) COVER TRAILING EDGE PROFILE

(75) Inventor: David Mark Stewart, Northen Ireland (GB)

(73) Assignee: Airbus Operations Limited, Bristol (GB)

( * ) Notice: Subject to any disclaimer, the term of this patent is extended or adjusted under 35 U.S.C. 154(b) by 317 days.

(21) Appl. No.: 12/897,988

(22) Filed: Oct. 5, 2010

(65) Prior Publication Data

US 2011/0095133 A1   Apr. 28, 2011

(30) Foreign Application Priority Data

Oct. 27, 2009 (GB) .................. 0918750.1

(51) Int. Cl.
*B64C 3/00* (2006.01)

(52) U.S. Cl. .................. 244/123.1; 244/131; 29/428

(58) Field of Classification Search .............. 244/123.1, 244/131; 29/428, 407.05
See application file for complete search history.

(56) References Cited

U.S. PATENT DOCUMENTS

| | | | |
|---|---|---|---|
| 5,501,414 A | 3/1996 | Bauer | |
| 5,919,543 A * | 7/1999 | McCarville et al. | 428/112 |
| 7,641,147 B2 | 1/2010 | Schmidt et al. | |
| 2005/0077435 A1* | 4/2005 | Burchard | 244/215 |
| 2009/0072091 A1* | 3/2009 | Al-Khalil | 244/134 A |
| 2009/0206203 A1* | 8/2009 | Crawford | 244/123.7 |
| 2010/0006700 A1* | 1/2010 | Stuhr et al. | 244/123.1 |
| 2011/0095133 A1* | 4/2011 | Stewart | 244/123.1 |
| 2012/0091276 A1* | 4/2012 | Al-Khalil | 244/134 A |

FOREIGN PATENT DOCUMENTS

EP   1288124 A1   3/2003

OTHER PUBLICATIONS

British Search Report for GB0918750.1 dated Feb. 8, 2010.

* cited by examiner

*Primary Examiner* — Christopher P Ellis
*Assistant Examiner* — Medhat Badawi
(74) *Attorney, Agent, or Firm* — Lowe Hauptman Ham & Berner, LLP

(57) ABSTRACT

An aircraft wing assembly, comprising a front spar, a rear spar, and upper and lower wing covers extending between the front and rear spars, wherein the upper and/or lower wing cover overhangs the rear spar and has a non-linear trailing edge profile forming an array of tabs and cut-outs. Also, a method of assembling the aircraft wing.

16 Claims, 3 Drawing Sheets

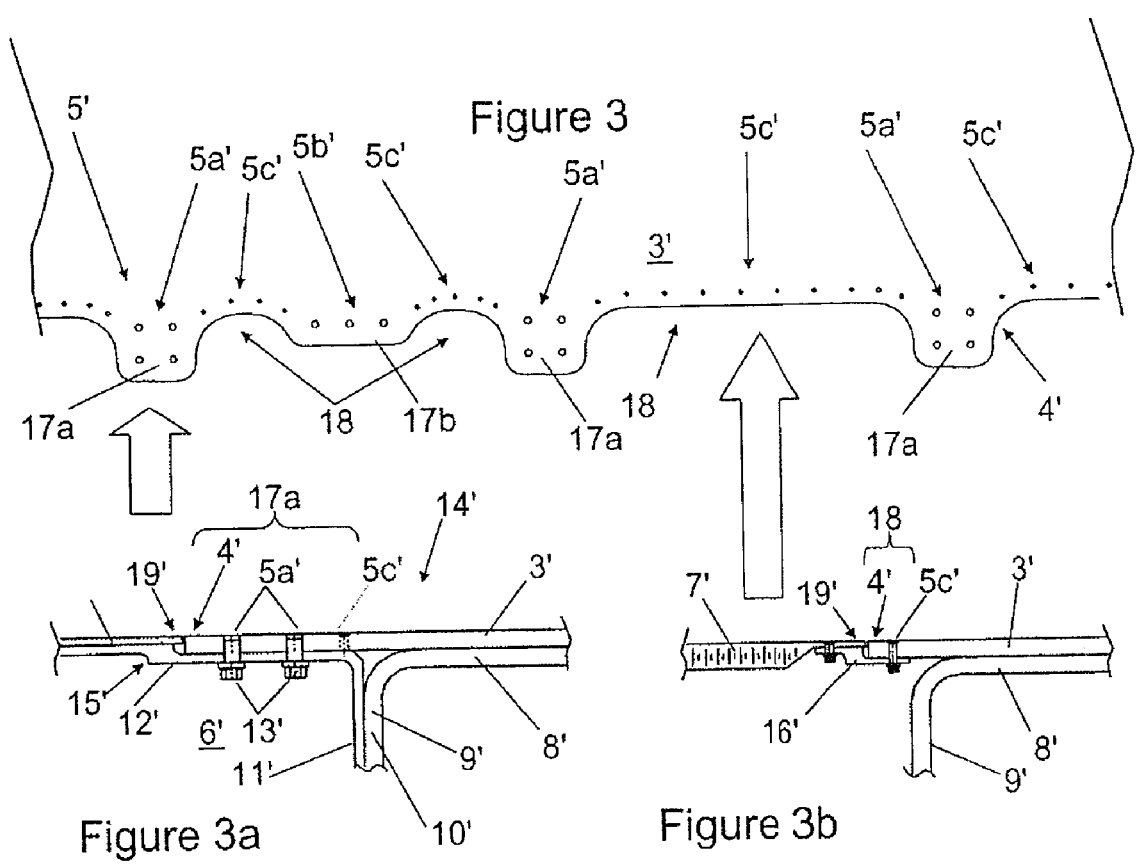

COVER TRAILING EDGE PROFILE

RELATED APPLICATION

The present application is based on, and claims priority from, British Application Number 0918750.1, filed Oct. 27, 2009.

FIELD OF THE INVENTION

The present invention relates to the trailing edge profile of an aircraft wing cover (skin). In particular, the invention relates to an aircraft wing assembly and a method of assembling an aircraft wing having the cover.

BACKGROUND OF THE INVENTION

Conventional aircraft wings comprise a wing box with front and rear spars. Upper and lower wing covers (skins) are attached to the spars and extend between them to form the upper and lower boundaries of the wing box. Leading and trailing edge structures, such as shroud panels or D-nose covers, are typically attached to the upper and lower covers with a butt joint. The leading and trailing edges of the upper and lower covers typically have a substantially linear profile for ease of manufacture and assembly with the leading and trailing edge structures.

The trailing edge of the covers typically overhangs the rear spar. Trailing edge ribs, which support trailing edge control surfaces such as, e.g., spoilers and ailerons, are typically fastened to the covers overhangs. These fastener holes can be highly loaded due, predominantly, to high span-wise wing cover strains in the region due to wing bending. Additional loading introduced from the ribs compounds the high loads on these fastener holes. This is not a new problem but the move to greater use of composite structures (such as fibre-reinforced laminates), which are generally less tolerant to bearing stress than their metallic predecessors, means that the overhang portion of the covers at the trailing edge needs to be relatively thick to support these loads. The weight penalty of this structural build up in the region is significant.

It is therefore an object of this invention to reduce weight in the region of the wing covers trailing edge.

SUMMARY OF THE INVENTION

A first aspect of the invention provides an aircraft wing assembly, comprising a front spar, a rear spar, and upper and lower wing covers extending between the front and rear spars, wherein the upper and/or lower wing cover overhangs the rear spar and has a non-linear trailing edge profile forming an array of tabs and cut-outs.

A further aspect of the invention provides a method of assembling an aircraft wing, comprising providing a front spar and a rear spar, and attaching upper and lower wing covers extending between the front and rear spars, wherein the attached upper and/or lower wing cover overhangs the rear spar and has a non-linear trailing edge profile forming an array of tabs and cut-outs.

The invention is advantageous in that the tabs are isolated, to some extent, from the wing bending strains in the cover(s). Therefore, structures, such as trailing edge ribs, may be fastened to these tabs and loads on the fastener holes will be lower as a result of this isolation. The cover thickness required at the overhang can therefore be reduced giving a significant weight saving over prior assemblies. The weight saving achieved over prior art arrangements may be several tens or even hundreds of kilograms per aircraft.

The assembly may further comprise a plurality of substantially chordwise extending ribs. The wing cover tabs may be provided at the rib locations. The ribs may include trailing edge ribs and the wing cover tabs may be fastened to the trailing edge ribs.

The assembly may further comprise at least one actuator, e.g. for controlling movement of trailing edge control surfaces. At least one of the wing cover tabs may be provided at the actuator location, and the actuator may be fastened to the wing cover tab.

The fasteners, which fasten the ribs and/or actuators to the cover, are preferably all located aft of the location of the cover trailing edge at the cut-outs. This isolates the wing bending strains from the fastener locations.

The assembly may further comprise a shroud panel abutting the wing cover. The shroud panel may have a profiled leading edge matching the trailing edge profile of the wing cover. The leading edge of the shroud panel may be fastened to the trailing edge of the wing cover at the cut-out locations between the tabs. The abutting cover and panel may be fastened with butt-straps. A upper shroud panel may be attached to the upper wing cover and/or a lower shroud panel may be attached to the lower wing cover. The or each shroud panel may be prepared by machining its leading edge profile to match the trailing edge profile of its respective wing cover.

Preferably, the tabs overhang the rear spar by a distance at least twice that of the cut-outs, and preferably at least three times. Preferably, the cut-outs occupy a majority of the trailing edge profile.

BRIEF DESCRIPTION OF THE DRAWINGS

Embodiments of the invention will now be described with reference to the accompanying drawings, in which:

FIG. 3 illustrates a wing cover trailing edge profile of this invention in plan view; FIG. 3a shows a cross section view through the cover/panel butt joint at the rib location indicated in FIG. 3; and FIG. 3b shows a cross section view through the cover/panel butt joint at the inter-rib location indicated in FIG. 3.

DETAILED DESCRIPTION OF EMBODIMENT(S)

Figure 1:
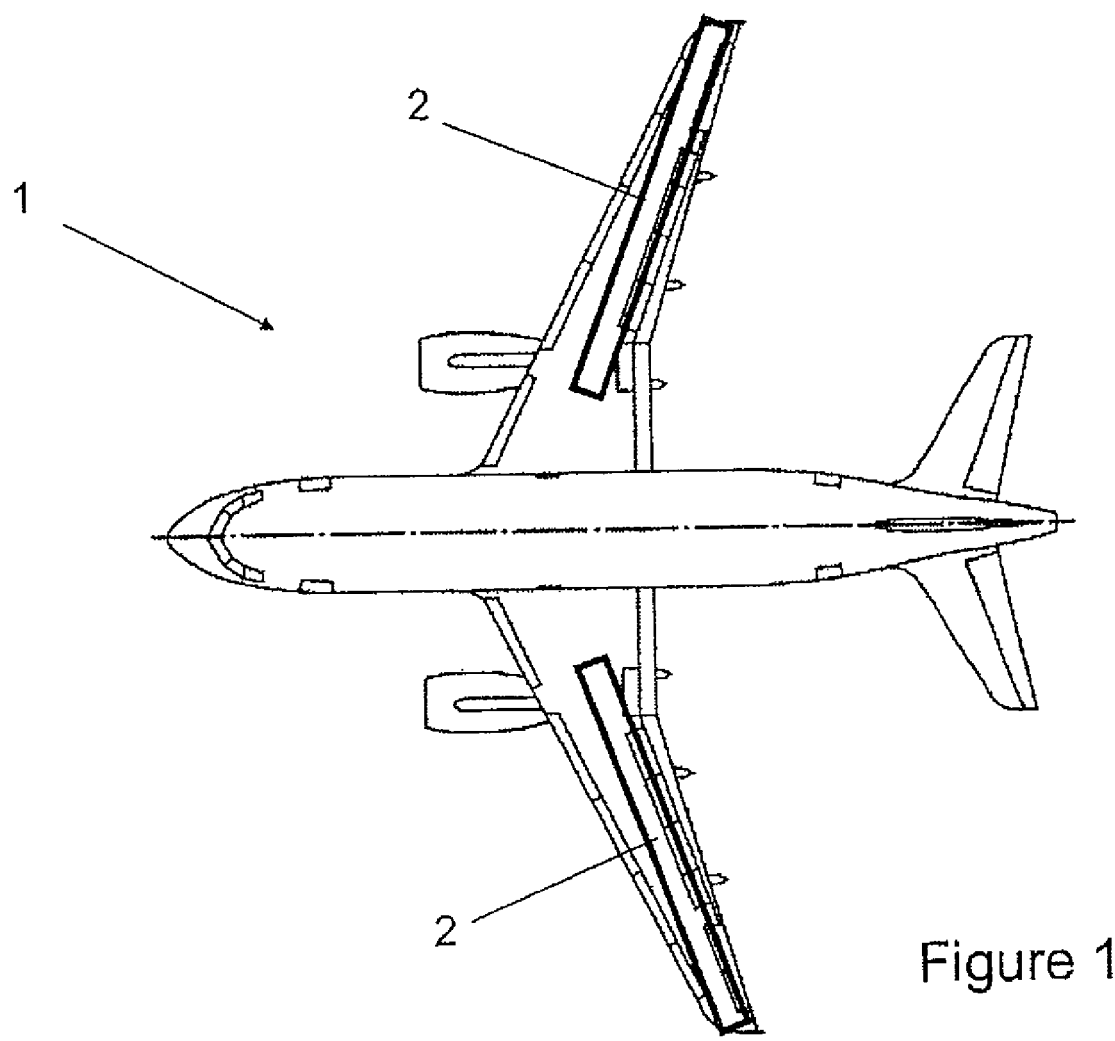
FIG. 1 illustrates a typical passenger aircraft in plan view, with the position of the wing cover trailing edge indicated.

FIG. 1 illustrates a typical passenger aircraft 1. The wings have a conventional wing box construction comprising front and rear spars, with upper and lower wing covers attached to the spars and extending between them to form the upper and lower boundaries of the wing box assembly. The upper wing cover is attached to a trailing edge shroud panel in the regions 2 of the wing highlighted in FIG. 1.

Figures 2, 2A, 2B:
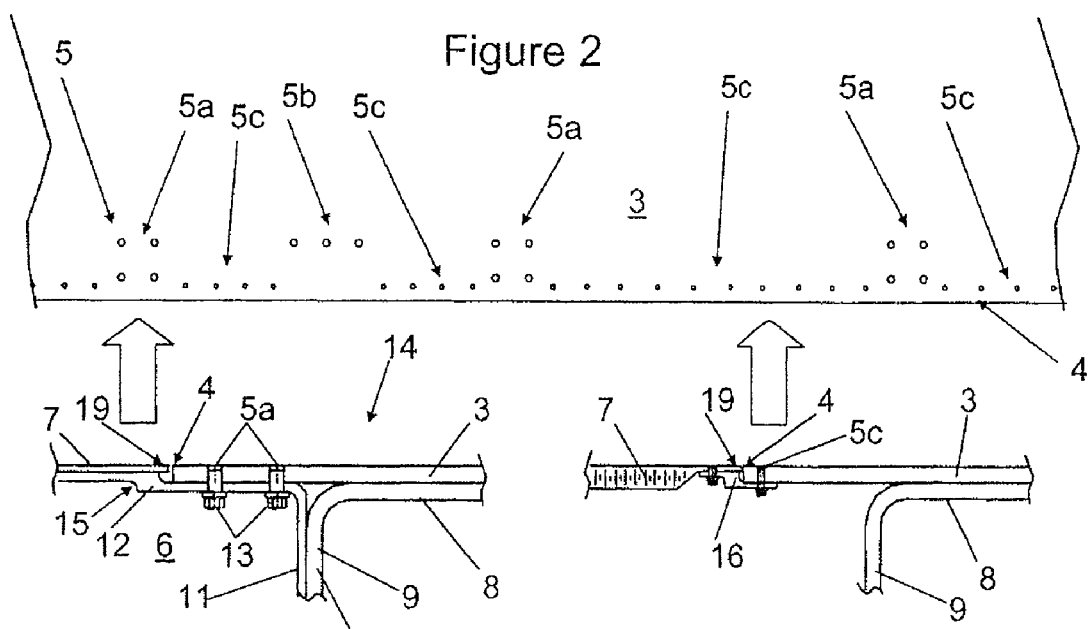
FIG. 2 illustrates a prior art wing cover trailing edge profile in plan view.
FIG. 2a shows a cross section view through the cover/panel butt joint at the rib location indicated in FIG. 2.
FIG. 2b shows a cross section view through the cover/panel butt joint at the inter-rib location indicated in FIG. 2.

FIGS. 2, 2a and 2b illustrate a prior art arrangement in the region 2. The upper wing cover 3 has a trailing edge 4. The trailing edge profile in the plan view of FIG. 2 is substantially linear. The cover 3 has an array of fastener holes 5. Holes 5a are arranged in groups of four in a square and are used for fastening the cover 3 to a trailing edge rib 6. Holes 5b are arranged in groups of three in line and are used for fastening the cover 3 to an actuator assembly (not shown). The actuator assemblies may be used for controlling the deployment of trailing edge aerodynamic control surfaces, such as spoilers or ailerons, for example. Groups of smaller holes 5c are arranged between the groups of holes 5a and 5b and are used for fastening the cover 3 to a trailing edge shroud panel 7.

FIG. 2a shows a cross section view of the prior art arrangement at the location of one of the trailing edge ribs 6. The cover 3 is attached to the upper flange 8 of C-section rear spar 9. The trailing edge 4 of the cover 3 extends beyond and overhangs the web 10 of rear spar 9. The foot 11 of rib 6 is attached to the web 10 of rear spar 9. The upper flange 12 of rib 6 is fastened to the overhanging portion of the cover 3 with fasteners 13 through the holes 5a. The extent of the overhang is dictated by the size and location of the fastener holes 5a in the cover 3. The trailing edge shroud panel 7 is attached to the upper flange 12 of rib 6. The leading edge 19 of panel 7 has a substantially linear profile matching the profile of the trailing edge 4 of cover 3. The panel 7 abuts cover 3 to form a flush continuous aerodynamic outer surface 14 for the wing. The upper flange 12 of rib 6 has a joggle 15 to accommodate the difference in thickness between the cover 3 and panel 7.

FIG. 2b shows a cross section view of the prior art arrangement between the ribs 6. The trailing edge 4 of the cover 3 here too overhangs the web 10 of rear spar 9, since the trailing edge 4 has a substantially linear profile. The cover 3 is fastened to the panel 7 with a butt-strap 16 of conventional type.

Since the cover 3 overhangs beyond the rear spar 9 with a substantially uniform width across the wing, wing bending causes significant span-wise strains to develop in the cover 3 at the trailing edge 4. This wing bending strain places significant load around the fastener holes 5a, in addition to the loads from the ribs 6. The fasteners 13 are necessarily larger, and the cover 3 in the overhang region is necessarily thicker, than is desirable in order to support these loads. This carries a significant weight penalty.

Turning now to FIGS. 3, 3a and 3b there is shown an arrangement in the region 2 in accordance with an embodiment of this invention. In the embodiment, similar parts to the prior art arrangement are denoted by like reference numerals but with a prime ('). Only the differences between the embodiment and the prior art arrangement will be described in the following. The profile of the trailing edge 4' of the cover 3' in the FIG. 3 plan view is substantially non-linear and forms an array of tab portions 17a, 17b and cut-out regions 18. The holes 5a' are formed in the tab portions 17a; the holes 5b' are formed in the tab portions 17b; and the holes 5c' are formed adjacent the cut-out regions 18. The tab portions 17a, 17b extend the cover trailing edge 4' further aft than at the cut-out regions 18.

FIG. 3a shows a cross section view of the arrangement in accordance with the embodiment at the location of one of the trailing edge ribs 6'. The tab portion 17a extends the trailing edge 4' of the cover 3' so as to overhang the web 10' of rear spar 9'. The extent of the overhang of the tab portion 17a is selected such that the fastener holes 5a' are positioned aft of the rows of fastener holes 5c'. In this way, the fastener holes 5a' are generally isolated from the wing bending strains in the cover 3'. However, some reduction in wing bending strain would still be seen from forming the cut-out regions 18 alone, even if the location of the fastener holes 5a' remained unchanged from the prior art arrangement. The leading edge 19' of panel 7' has a substantially non-linear profile matching the non-linear profile of the trailing edge 4' of cover 3'.

FIG. 3b shows a cross section view of the arrangement in accordance with the embodiment between the ribs 6'. The trailing edge 4' of the cover 3' in the cut-out region 18 here too overhangs the web 10 of rear spar 9, but the width of the overhang here is less than the width of the overhang in the tab portions 17a, 17b. The extent of the overhang in the cut-out region 18 is dictated by the size and location of the fastener holes 5c', and not the fastener holes 5a'. The width of the overhang in the tab portions 17a, 17b is at least two and in some cases three or more times the width of the overhang in the cut-out regions 18.

By forming the cut-out regions 18 in the cover 3', the following advantageous weight-saving changes can be seen in the embodiment over the prior art arrangement:
- the size of the fasteners 13' between the ribs 6' and the panel 7' is reduced
- the width of the ribs 6' is reduced
- the cover 3' thickness in the overhang is reduced (the minimum thickness being set by the joint between the cover 3' and the spar flange 8')
- the size of the joggle 15' in the rib flange 12' is reduced due to the reduction in cover 3' thickness, which improves load continuity By forming the cut-out regions 18 in the cover 3', the surface area of the cover 3' is reduced. Therefore, the panel 7' must have a larger surface area than the panel 7 of the prior art arrangement to maintain the same wing surface area. Nevertheless, a significant weight saving is achieved as the additional portion of the panel 7' is lighter than the cover 3' which it is replacing.

Moving the fastener holes 5a' such that they are positioned aft of the fastener holes 5c' (as in the preferred embodiment shown) carries a slight weight penalty over just forming the cut-out regions 18 due to the increase in cover 3' overhang width in the tab regions 17a. However, this is more than offset by implementing the weight saving changes outlined above due to the improved isolation of the wing bending strains from around the fastener holes 5a'.

The wing assembly in accordance with this invention is manufactured in a similar manner to the prior art assembly, the key difference being how to form and assemble the modified cover 3' and panel 7'. The cover 3' preferably has a laminate construction of fibre-reinforced composite plies, such as carbon-fibre reinforced epoxy, for example, similar to the cover 3. The panel 7' preferably has a sandwich construction of laminated fibre-reinforced composite ply skins either side of a core layer, similar to the panel 7. The core layer is only provided in the middle of the panel 7' and the skins are joined around the periphery of the panel. The cover 3' poses no particular problems in machining the trailing edge 4' profile during manufacture.

However, the core layer in the sandwich panel 7' presents some challenges, as the shape of the core layer may need to be matched approximately to the non-linear profile of the panel 7' leading edge 19'. Otherwise, the core layer may need to be omitted from the leading edge region of the panel 7' altogether. In either case, the leading edge 19' profile of the panel will need to be machined to match the trailing edge 4' profile of the cover 3'. This may be done by measuring the cover 3' profile and then performing the panel 7' machining operation.

It is to be noted that this invention is particularly, though not exclusively, suited to composite wing assemblies. As such, a conventional metallic wing assembly may also benefit from adopting this invention.

Whilst the embodiment described above relates to modifications to the upper wing cover, it will be appreciated that this invention is equally applicable to the lower wing cover, which is joined to a lower shroud panel in a virtually identical manner.

In the embodiment described above, the cover and panel butt joint is fastened using conventional butt-straps. However, it will be appreciated that the butt joint may be formed using other devices or fastening schemes.

Although the invention has been described above with reference to one or more preferred embodiments, it will be appreciated that various changes or modifications may be made without departing from the scope of the invention as defined in the appended claims.

The invention claimed is:

1. An aircraft wing assembly, comprising a front spar, a rear spar, and upper and lower wing covers extending between the front and rear spars, wherein the upper and/or lower wing cover overhangs the rear spar and has a non-linear trailing edge profile forming an array of tabs and cut-outs.

2. An assembly according to claim 1, wherein the tabs overhang the rear spar by a distance at least twice that of the cut-outs, and preferably at least three times.

3. An assembly according to claim 1, further comprising a plurality of substantially chordwise extending ribs, wherein the ribs are fastened to the wing cover tabs.

4. An assembly according to claim 1, further comprising at least one actuator, wherein the actuator is fastened to one of the wing cover tabs.

5. An assembly according to claim 3, wherein the fasteners in the wing cover tabs are disposed aft of the cover trailing edge at the cut-outs.

6. An assembly according to claim 1, further comprising a shroud panel abutting the wing cover and having a profiled leading edge matching the trailing edge profile of the wing cover.

7. An assembly according to claim 6, wherein the leading edge of the shroud panel is fastened to the trailing edge of the wing cover at the cut-out locations between the tabs.

8. An assembly according to claim 7, wherein the abutting cover and panel are fastened with butt-straps.

9. A method of assembling an aircraft wing, comprising providing a front spar and a rear spar, and attaching upper and lower wing covers extending between the front and rear spars, wherein the attached upper and/or lower wing cover overhangs the rear spar and has a non-linear trailing edge profile forming an array of tabs and cut-outs.

10. A method according to claim 9, wherein the tabs overhang the rear spar by a distance at least twice that of the cut-outs, and preferably at least three times.

11. A method according to claim 9, wherein the tabs are provided at rib locations, and the method further comprises fastening trailing edge ribs to the wing cover tabs.

12. A method according to claim 9, wherein the tabs are provided at actuator locations, and the method further comprises fastening one or more actuators to respective wing cover tabs.

13. A method according to claim 11, wherein the fasteners in the wing cover tabs are disposed aft of the cover trailing edge at the cut-outs.

14. A method according to claim 9, further comprising fastening an abutting shroud panel to the trailing edge of the wing cover at the cut-out locations between the tabs.

15. A method according to claim 14, wherein the cover and panel are fastened with butt-straps.

16. A method according to claim 14, wherein the shroud panel is prepared by machining its leading edge profile to match the trailing edge profile of the wing cover.

* * * * *